(No Model.)
H. L. WHITMAN.
BROADCAST SEED SOWER.
No. 307,610. Patented Nov. 4, 1884.
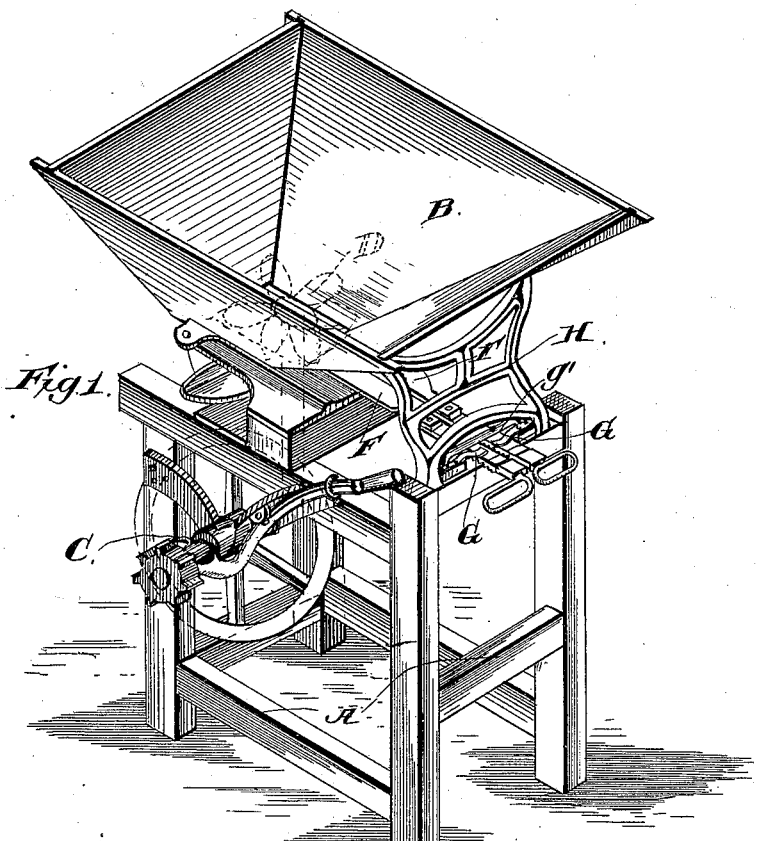
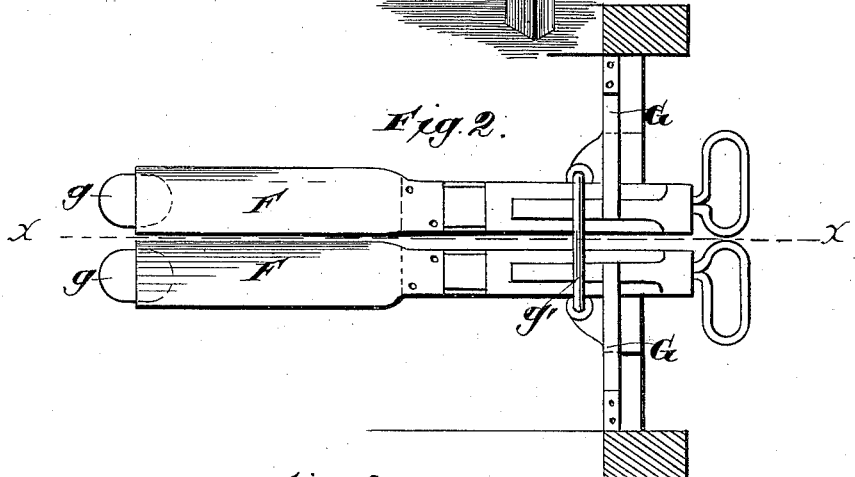
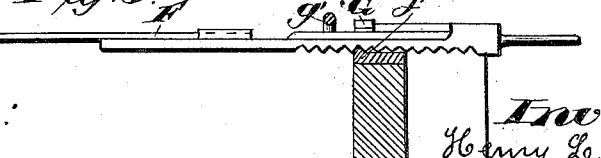
Witnesses:
M. E. Boarman
J. M. Nichols
Inventor:
Henry L. Whitman
by E. S. Holmes
Att'y

UNITED STATES PATENT OFFICE.

HENRY L. WHITMAN, OF ST. LOUIS, MISSOURI.

BROADCAST SEED-SOWER.

SPECIFICATION forming part of Letters Patent No. 307,610, dated November 4, 1884.

Application filed August 5, 1884. (No model.)

*To all whom it may concern:*

Be it known that I, HENRY L. WHITMAN, a citizen of the United States, residing at St. Louis, in the State of Missouri, have invented certain new and useful Improvements in Broadcast Seed-Sowers, of which the following is a specification, reference being had to the accompanying drawings, in which—

Figure 1 is a perspective view of my improved seed-sower. Fig. 2 is a detail plan of the feed levers or slides for feeding and regulating the throw of the seed; and Fig. 3 is a view, partly in section, on line $x\ x$, Fig. 2.

My improvements relate to the class of broadcast sowers in which the seed is fed from a hopper to a revolving wheel or disk provided with wings or blades, and with a suitable clutch on the driving-shaft for shipping and unshipping the driving mechanism; and it consists in certain details in the construction of the feed-levers for closing the openings or seedways in the bottom of the hopper, and a bracket for supporting the hopper and levers, as I will now proceed to fully and clearly describe, referring to the accompanying drawings, in which like letters of reference indicate corresponding parts in the different views.

A represents the frame of the machine; B, the hopper for holding the seed.

C represents the main driving-shaft, which revolves the distributing disk or wheel D by means of suitable gears and pinions in a well-known manner. The disk or wheel D is mounted on the end of a vertical shaft underneath the hopper, receives the seed therefrom, and by means of wings or blades thereon scatters it broadcast as the wheel is revolved. The main shaft is provided with a pulley or sprocket by which it is rotated through the intervention of a belt or chain. The shaft C is also provided with a clutch, and a shipping and unshipping lever connected thereto, so that the machine may be started and stopped at the will of the operator.

F F represent slides or levers for regulating the quantity of seed to be sown by opening or closing the orifices $g\ g$ in the bottom of the hopper. (See Fig. 2.) These slides F F rest horizontally on the top of the frame-work at the front of the machine. They are formed with teeth or niches on their under sides, as shown, and these teeth are adapted to engage with a metal bar, $f$, attached to the top cross-beam of the frame-work. These levers have handles for operating them substantially in the same horizontal plane as the levers. Springs G G are secured to this cross-beam at each side of the levers or slides, rest upon the top of them, and serve to hold them in any desired position. A loop or bar, $g'$, is also secured to the frame-work or bracket attached thereto, extends over the top of the levers, and limits their movements.

H represents a bracket for securing the hopper to the frame. This bracket is attached to the top of the frame at one end, and to the hopper at the other.

The machine when used is mounted upon a wagon or other suitable vehicle, so that the grain or seed will be scattered from the sides and rear when the team is driven forward. It is important that the feed levers or slides especially should be within reach of the driver, and by having them rest horizontally on the frame-work he is better able to reach them with one hand while controlling his team with the other than if they were in any other position. The orifices may be entirely opened or partially closed by moving the slides in or out, and held in any given position by means of the ratchet-teeth on their under sides and the bar on the frame, as well as by the spring resting on the tops of the slides. By using the metal bracket H to connect the frame and hopper, instead of extending the uprights of the frame to support the hopper, I am enabled not only to thus provide a stay for the levers or slides, but am also enabled to remove the bracket and hopper from the frame, so that the machine will occupy much less space in shipment than if the uprights were extended. I am aware of Patents Nos. 122,405, 181,978, and 195,570, and do not claim anything therein shown.

Having thus fully described my improvements, what I claim as new, and desire to secure by Letters Patent, is—

1. In a broadcast seed-sower, the horizontal levers for opening or closing the orifices in the hopper, provided with ratchet-teeth on their under sides, and adapted to engage with a suitable bar on the top cross-beam of the frame, and handles for operating them in substantially the plane of the levers, as set forth.

2. In a broadcast seed-sower, the horizontal levers for opening or closing the orifices in the hopper, provided with ratchet-teeth on their under sides, and adapted to engage with a suitable bar on the top cross-beam of the framework, and springs attached to said cross-beam and resting on top of the levers or slide, substantially as set forth.

3. In a broadcast seed-sower, a metal bracket, H, attached at one end to the top cross-beam of the frame, and at the other to the hopper, substantially as and for the purpose set forth.

In testimony whereof I have affixed my signature in presence of two witnesses.

HENRY L. WHITMAN.

Witnesses:
GEORGE E. BENNETT,
W. A. STEPHENS.